United States Patent
Vinogradov et al.

(10) Patent No.: US 11,346,809 B2
(45) Date of Patent: May 31, 2022

(54) MAGNETOSTRICTIVE TESTING WITH WIRELESS TRANSMITTER(S) AND REMOTE RECEIVER(S)

(71) Applicant: Southwest Research Institute, San Antonio, TX (US)

(72) Inventors: Sergey A. Vinogradov, San Antonio, TX (US); Jonathan Bartlett, San Antonio, TX (US); Clinton Thwing, Bulverde, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 16/945,849

(22) Filed: Aug. 1, 2020

(65) Prior Publication Data

US 2022/0034842 A1 Feb. 3, 2022

(51) Int. Cl.
*G01N 27/82* (2006.01)
(52) U.S. Cl.
CPC .................................. *G01N 27/82* (2013.01)
(58) Field of Classification Search
CPC ....................................................... G01N 27/82
See application file for complete search history.

(56) References Cited

U.S. PATENT DOCUMENTS

| | | | | |
|---|---|---|---|---|
| 5,959,388 | A * | 9/1999 | Graebner | H03H 9/6403 333/201 |
| 6,624,628 | B1 * | 9/2003 | Kwun | G01N 29/11 324/240 |
| 2009/0174399 | A1 * | 7/2009 | Vinogrador | G01N 27/82 324/238 |
| 2018/0164256 | A1 * | 6/2018 | Vinogradov | G01N 29/043 |
| 2019/0187104 | A1 * | 6/2019 | Vinogradov | G01N 29/04 |

* cited by examiner

*Primary Examiner* — Dominic E Hawkins
(74) *Attorney, Agent, or Firm* — Livingston Law Firm

(57) ABSTRACT

A method of magnetostrictive (MS) guided wave testing of a ferromagnetic structure. One or more MS transmitters, each configured as a patch of ferromagnetic material, are acoustically coupled to the structure. Each MS transmitter is magnetized to produce a bias magnetic field in the patch. One or more MS receivers are acoustically coupled to the structure in a location remote from the MS transmitter(s). An alternating current (AC) is applied to the structure, thereby producing time-varying magnetic fields and MS vibrations in the MS transmitter(s) resulting in guided waves in the structure. MS response signals are received at the MS receiver(s), indicating whether the structure has any anomalies.

14 Claims, 8 Drawing Sheets

MAGNETOSTRICTIVE TESTING WITH WIRELESS TRANSMITTER(S) AND REMOTE RECEIVER(S)

TECHNICAL FIELD OF THE INVENTION

This invention relates to nondestructive evaluation of structures, and more particularly to using magnetostrictive test methods for such evaluation.

BACKGROUND OF THE INVENTION

One effective method for inspecting and monitoring various structures is guided wave testing using magnetostrictive (MS) technology. The principle of magnetostriction is based on either shifting or oscillation/rotation between magnetic domains in the material due to applied magnetic fields. Typically, a permanent magnetic field is used to give the domains a preferred orientation (bias). Variable magnetic fields are also applied to initiate rotation of the domains causing dimensional changes.

Depending on the mutual orientation (in-plane or out-of-plane) and on the mutual magnitude of the magnetic fields, oscillation of domains can produce longitudinal or transverse vibrations within the material being tested. An anomaly in the material will produce a variation in MS response signals and can thereby be detected.

Various configurations of MS sensors/receivers (also referred to as probes) have been developed for applying the desired magnetic fields and receiving response signals from the material. Conventional monitoring using MS methods requires a network of wired probes attached or embedded to a monitored structure. The wires are used to activate the probes to produce the variable magnetic field.

The need to use wired MS probes limits the applicability of MS monitoring methods. There may be situations where wires cannot be placed due to limited access. Or, if the number of probes is large, wiring each probe presents difficult engineering challenges.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

As stated in the Background, for MS testing, the material under test is given a bias magnetic field. A variable magnetic field is also applied. In conventional MS testing, an MS sensor often provides both the bias field and the variable magnetic field via a coil wired for external activation.

The method described herein is directed to testing materials that are ferromagnetic. This allows a local area of the material to be pre-magnetized with a ferromagnetic patch, resulting in the bias magnetic field. The desired variable magnetic field is provided by applying an AC current directly to the material. The patch then produces vibrations in the material, and thereby acts as a wireless transmitter of the vibrations. The vibrations form guided waves in the material, which produce reflected signals when anomalies are encountered. These reflected signals are received by an MS receiver that may be remote from the transmitter.

In other words, for activating the guided waves, there are no wired probes. Rather than being applied to probes, the activation current is applied to the material under test. The method is based on a reversed Wiedemann effect for generation of transverse vibration and on a Joule effect for generation of longitudinal vibrations.

Transmitter Configurations

Figure 1:
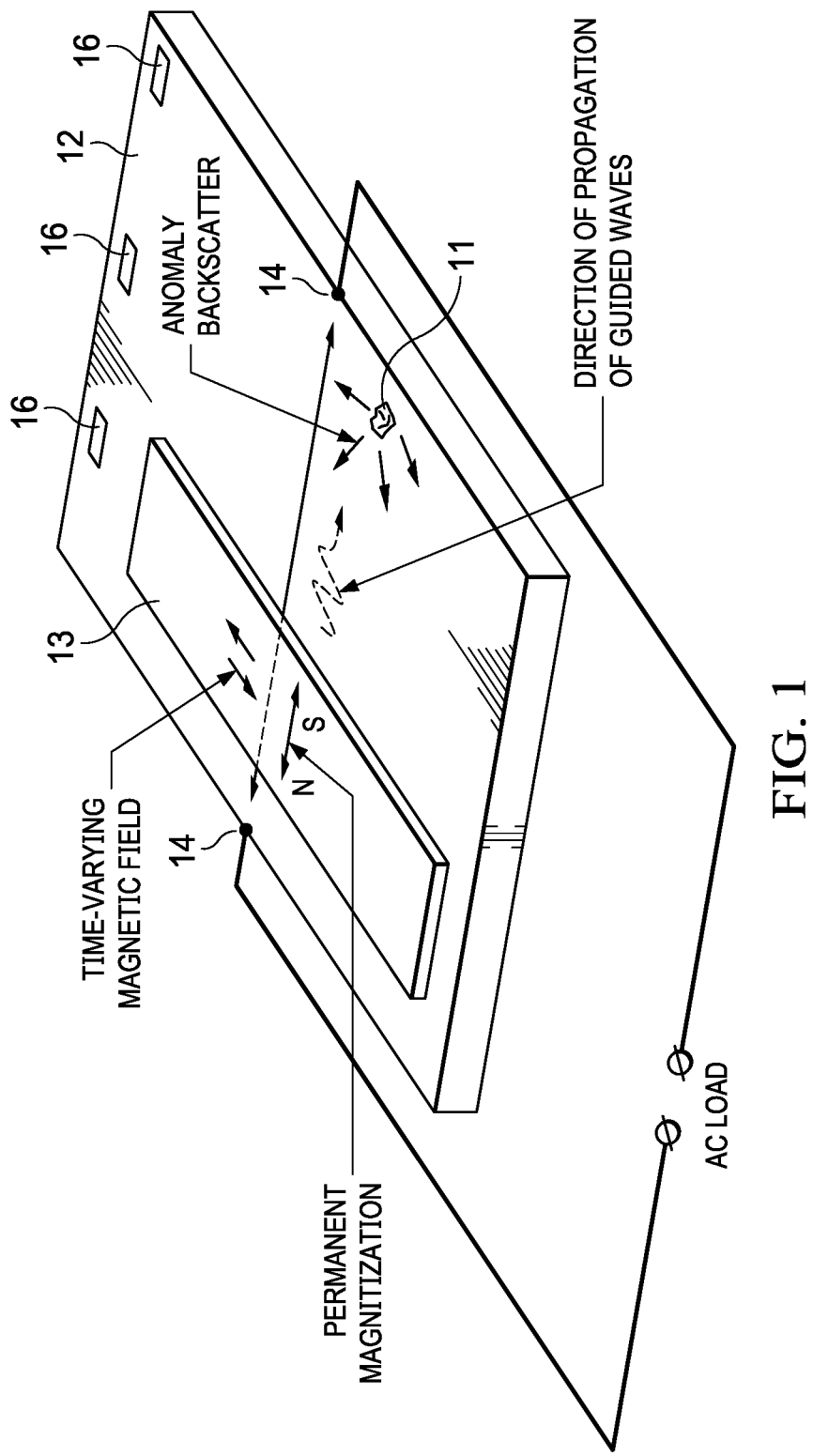
FIG. 1 illustrates a wireless MS method of generating and using transverse guided waves for detecting anomalies.

FIG. 1 illustrates a wireless MS method of generating and using transverse (shear horizontal) guided waves for detecting an anomaly 11 in a material 12. The material 12 is assumed to be part of a larger structure undergoing MS evaluation for structural anomalies.

The transmitter 13 is a ferromagnetic patch coupled directly to the material 12. The patch is typically a flat and thin piece of ferromagnetic material, which may be rectangular or have other geometries. In general, the patch has planar dimensions (length and width) and a thickness much smaller than its planar dimensions. The transmitter 13 is designated as such because it transmits vibrations into the material being tested, resulting in guided waves in the material.

Transmitter 13 is permanently magnetized, which may be achieved by permanent magnets on or in transmitter 13, by residual magnetization, or by an external magnetic field. As indicated in FIG. 1, the magnetization (N-S) is in the direction of propagation of the guided waves. This magnetization provides the bias magnetization required for MS guided wave generation, and allows transmitter 13 to provide the desired MS magnetic fields when activated with alternating current (AC).

The transmitter 13 (ferromagnetic patch) can be acoustically coupled to the material using a dry coupling method with mechanical pressure providing mechanical traction. Alternatively, transmitter 13 may be bonded, deposited using cold/hot spray method, brazed or spot welded.

Two appropriately spaced electrodes 14 are attached to the material 12, creating an AC current within the material 12 under transmitter 13. When electrodes 14 are activated with AC current, a time-varying magnetic field is generated within transmitter 13. This AC activation is remote from the transmitter 13 in the sense that it is by means of electrodes 14 attached to the material under test, rather than to the transmitter.

Because the time-varying magnetic field is perpendicular to the permanent magnetic bias, the result is in-plane domain oscillation. This oscillation will generate transverse vibrations with the frequency of the time-varying magnetic field. The transverse vibration will form shear horizontal guided waves that can propagate long distances in a tested structure.

One or more MS receivers 16 are acoustically coupled to material 12 in locations where they can be conveniently wired. If a wave generated by transmitter 13 encounters an anomaly, it will produce backscattered waves that can be captured by receivers 16. Various configurations of MS receivers are known in the art of MS guided wave testing. The receiver(s) are passive in the sense that no AC activation is required.

Figure 2:
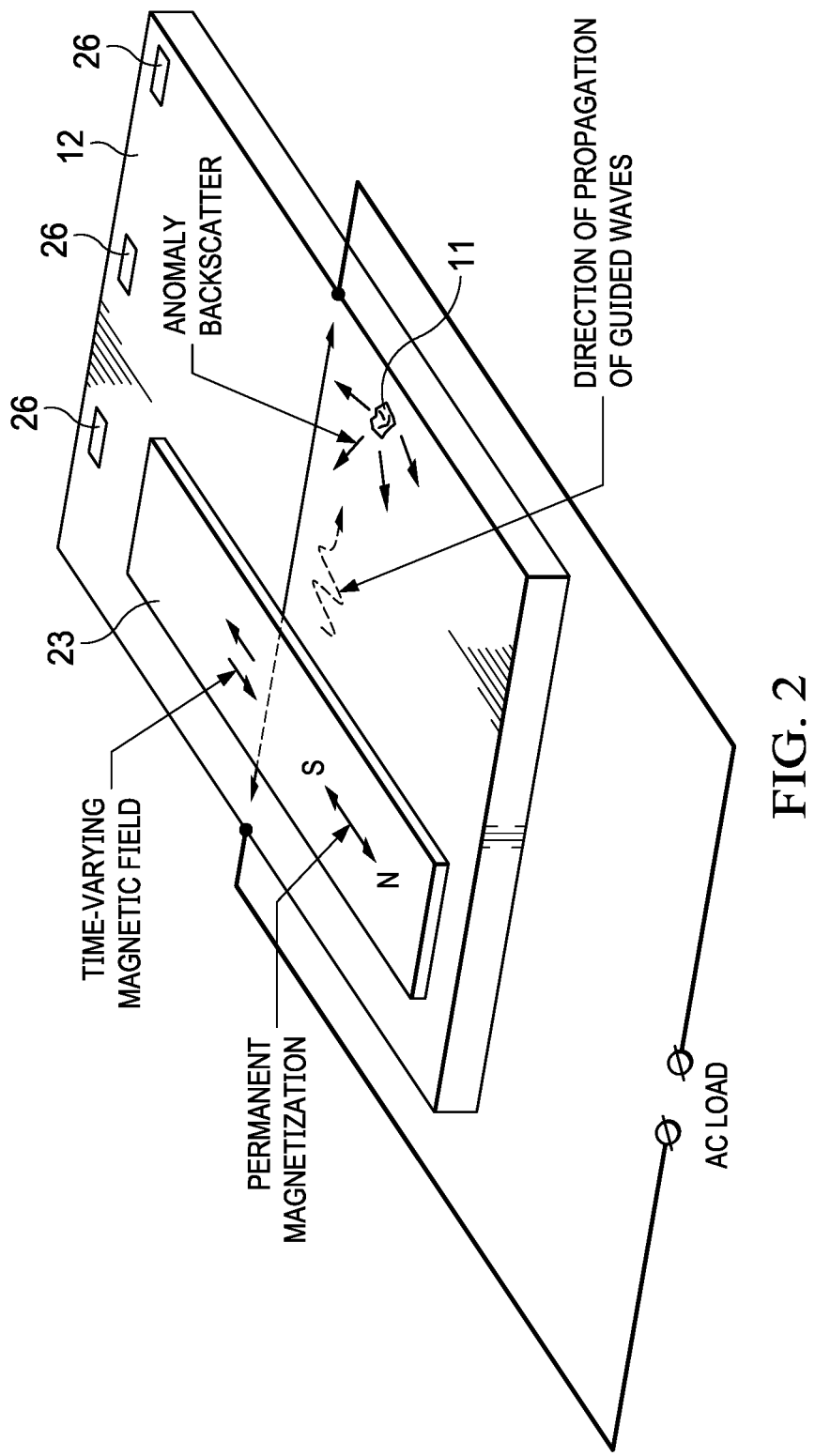
FIGS. 2 and 3 illustrate wireless MS methods of generating and using compressional guided waves for detecting anomalies.
Figure 3:
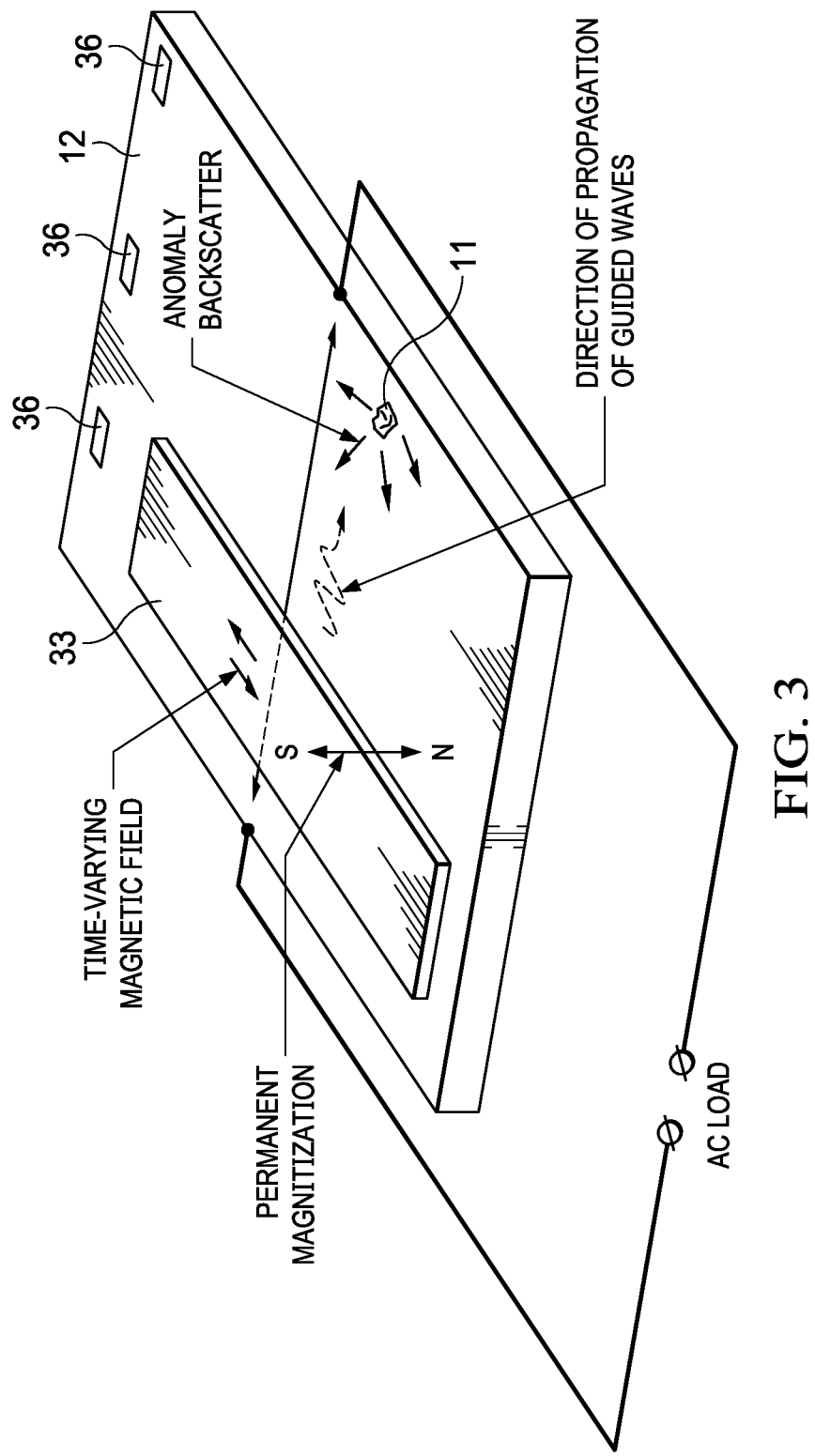

FIGS. 2 and 3 illustrate wireless MS methods similar to that of FIG. 1, but for generating and using longitudinal (compressional) guided waves. These methods are particularly useful for generating A0 or S0 wave modes in plate structures.

In both configurations of FIGS. 2 and 3, the transmitters 23 and 33 are a ferromagnetic patch as in the configuration of FIG. 1. The methods of FIGS. 2 and 3 differ from each other in the manner of permanent (bias) magnetization of the patches that form transmitters 23 and 33. In FIG. 2, the permanent magnetization is applied to transmitter 23 parallel to the time-varying magnetic field. This magnetization is similar to that of FIG. 1 in that it is across the plane of the patch, but in a perpendicular direction. In FIG. 3, the permanent magnetization is applied through the thickness of the patch rather than across the plane of the patch.

In both configurations of FIGS. 2 and 3, the transmitters 23 and 33 are remotely activated with AC current to produce a time-varying magnetic field. The permanent magnetization in combination with the applied time-varying magnetic field will result in out-of-plane domain displacement.

As in FIG. 1, wired MS receivers 26 and 36 receive reflected/backscattered signals from an anomaly in the material being tested.

Power Requirements

A short duration (100 microsecond) pulsing current (frequency range 10-200 kHz) applied to a structure creates a time varying magnetic field near its surface. This time varying magnetic field can be used for activating one or more pre-magnetized ferromagnetic patches (transmitters 13, 23, and 33) bonded to the structure.

The power needed for activation depends on the impedance of the tested structure and also on the magnetic properties of the ferromagnetic patch. Some magnetically soft materials only need a fraction of an Ampere for domain oscillations. The range of applied power can be adjusted depending on the application. In some cases, a naturally flowing current can result in patch excitation.

Example Implementation

Figure 4:
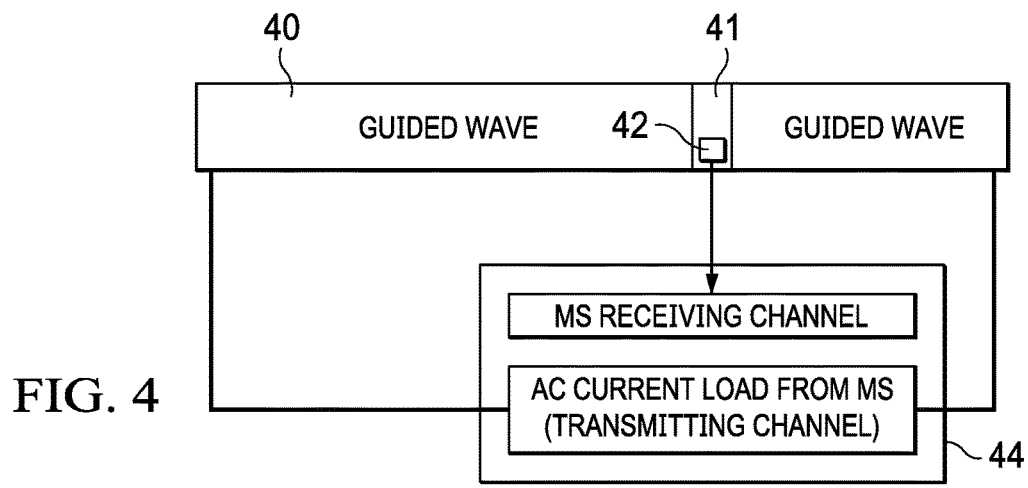
FIG. 4 illustrates an example of a wireless MS test setup.

FIG. 4 illustrates an example of an implementation of the above-described wireless transmitter and remote receiver systems. The type of guided wave will be dependent on the magnetization of the transmitter. If magnetized as shown in FIG. 1, the guided waves will result from transversal (shear stress) vibration. If magnetized as shown in FIG. 2 or 3, the guide waves will result from longitudinal vibration.

A transmitter (ferromagnetic patch) 41 was bonded at a distance of about two feet from one end of three-inch outer diameter schedule 40 pipe 40. A receiver 42 was placed on top of the transmitter 41 and connected to a passive receiving channel of an MS instrument 44.

A transmitting channel of the MS instrument 44 was used for applying a voltage to the pipe 40. Two wires were attached to the ends of the pipe 40.

MS instrument 44 is assumed to further be operable for processing MS signals for analysis. It has appropriate hardware and software for controlling and delivering the AC current to the MS transmitter(s) and for receiving MS signals from the MS receiver(s), as well as other MS processing tasks known in the art of MS testing.

Figure 5:
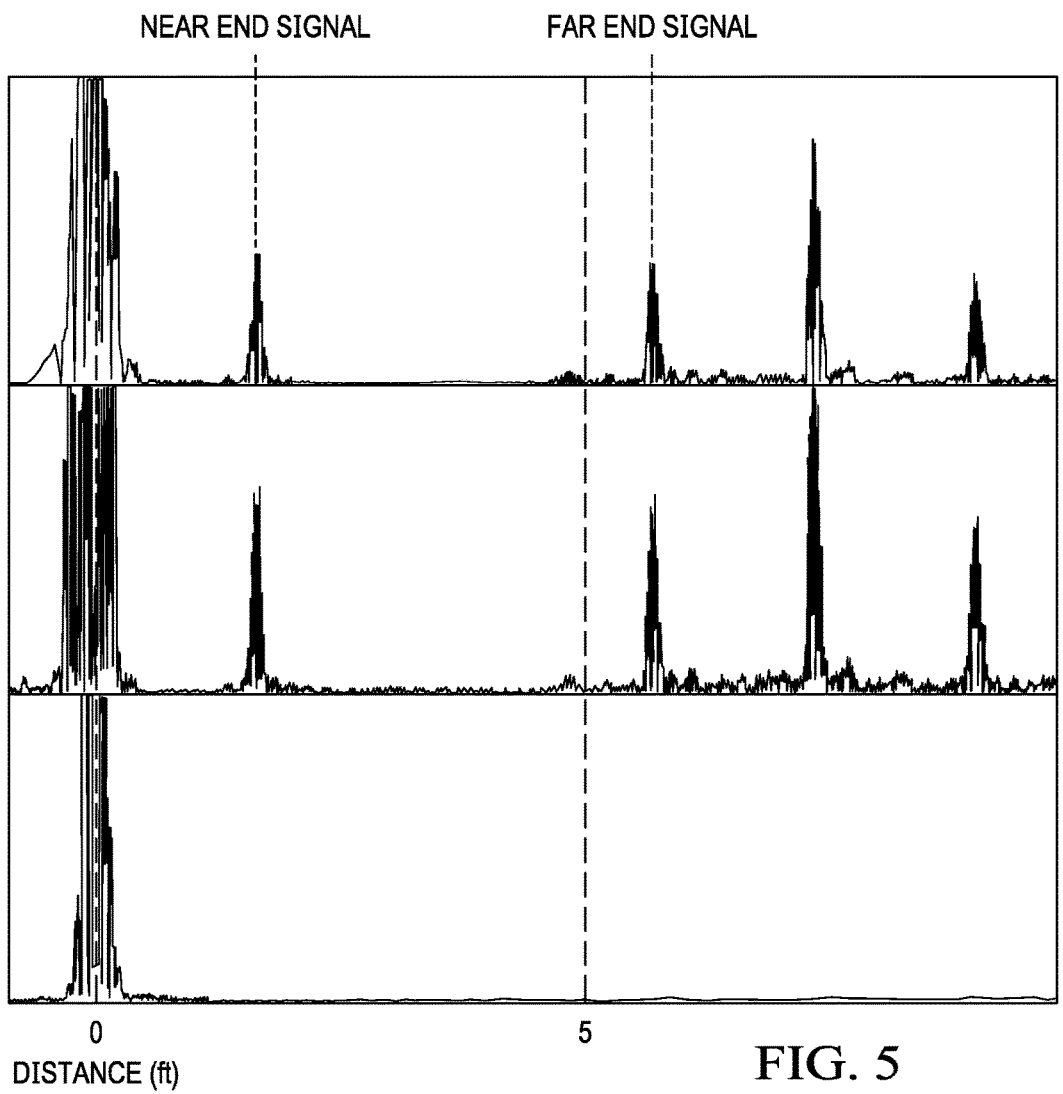
FIG. 5 illustrates experimental proof of principal data for using a wireless MS transmitter.

FIG. 5 (top plot) illustrates data acquired at 60 kHz and 30 dB amplifier gain settings. The MS instrument 44 was running in pitch-catch mode. Both ends of the pipe 42 produced reflections, indicating that a guided wave was generated in the pipe by the transmitter 41 activated by AC current applied to the pipe 42. The energy was received by the receiver 43.

In a second experiment, a conventional MS transmitter/receiver coil was connected directly to an MS instrument running in pulse-echo mode. FIG. 5 (middle plot) shows that the same signal pattern was obtained but with a 30 dB stronger signal. This stronger signal can be explained by the higher efficiency of an activation coil placed on top of the ferromagnetic patch due to multiple turns of the coil.

To confirm that in the first experiment the transmitter 41 was activated by current flowing in the pipe, in a third experiment, the setup of FIG. 4 was used but with the AC wires disconnected from the pipe. This setup ensured that it was not a crosstalk effect causing activation of the transmitter in the first experiment. As it can be seen in FIG. 5 (bottom plot), no signal was observed.

This set of three experiments confirms that the activation of a wireless MS transmitter may be achieved by activating the material under test. Once the MS transmitter is activated, the transmitted energy may be captured by a remote passive MS receiver.

Applications

The above-described method of MS monitoring with wireless transmitter activation is especially useful when it is necessary to monitor the condition of internal parts but there is no way to use wall penetration for routing wires. One or more wireless MS transmitters such as those of FIGS. 1-3 can be permanently installed in interior or difficult-to-access locations, with one or more wired MS receivers installed where convenient.

The wireless MS transmitter method is applicable for MS monitoring of any components where long-term installation of ferromagnetic patches is feasible (pipes, H-beams, rods, etc.). Although not explicitly shown in each figure, each application uses an MS instrument for applying the AC load to the structure under test, and for receiving MS signals from the receivers, as well as other MS processing tasks appropriate to the application.

Figure 6:
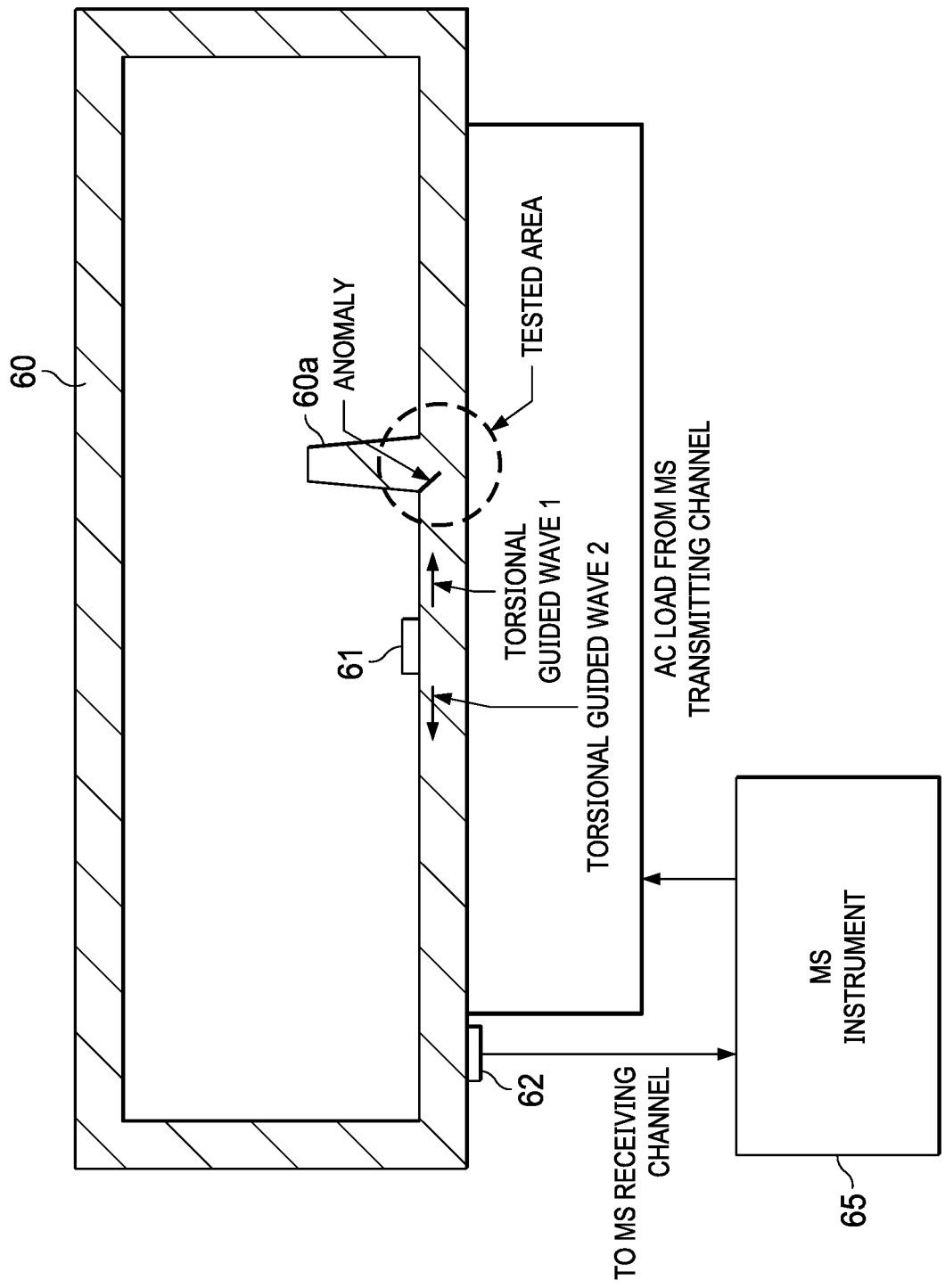
FIGS. 6-9 illustrates various applications of MS testing using one or more wireless MS transmitter(s) and one or more remote wired receiver(s).

FIG. 6 illustrates a thick-walled component 60 having an interior rib 60a. A wireless MS transmitter 61 is acoustically coupled the inside wall. The AC load is connected to the exterior of the component 60. If the transmitter 61 is activated with AC current, it will transmit guided waves within the component 60. If a new condition (anomaly) is presented, its signal reflections can be picked up by a wired receiver 62 installed outside of the component 60 and connected to an MS instrument 65.

A network of wireless MS transmitters and remote MS receivers can be used. A number of wireless MS transmitters can be installed and activated simultaneously as long as they are positioned on the material conducting the AC current. The transfer function of each transmitter can be adjusted in a way that allows different transmitters to respond better to one or another frequency input. This will help to differentiate response indications based on proximity to the specific transmitter and transmitter location.

Figure 7:
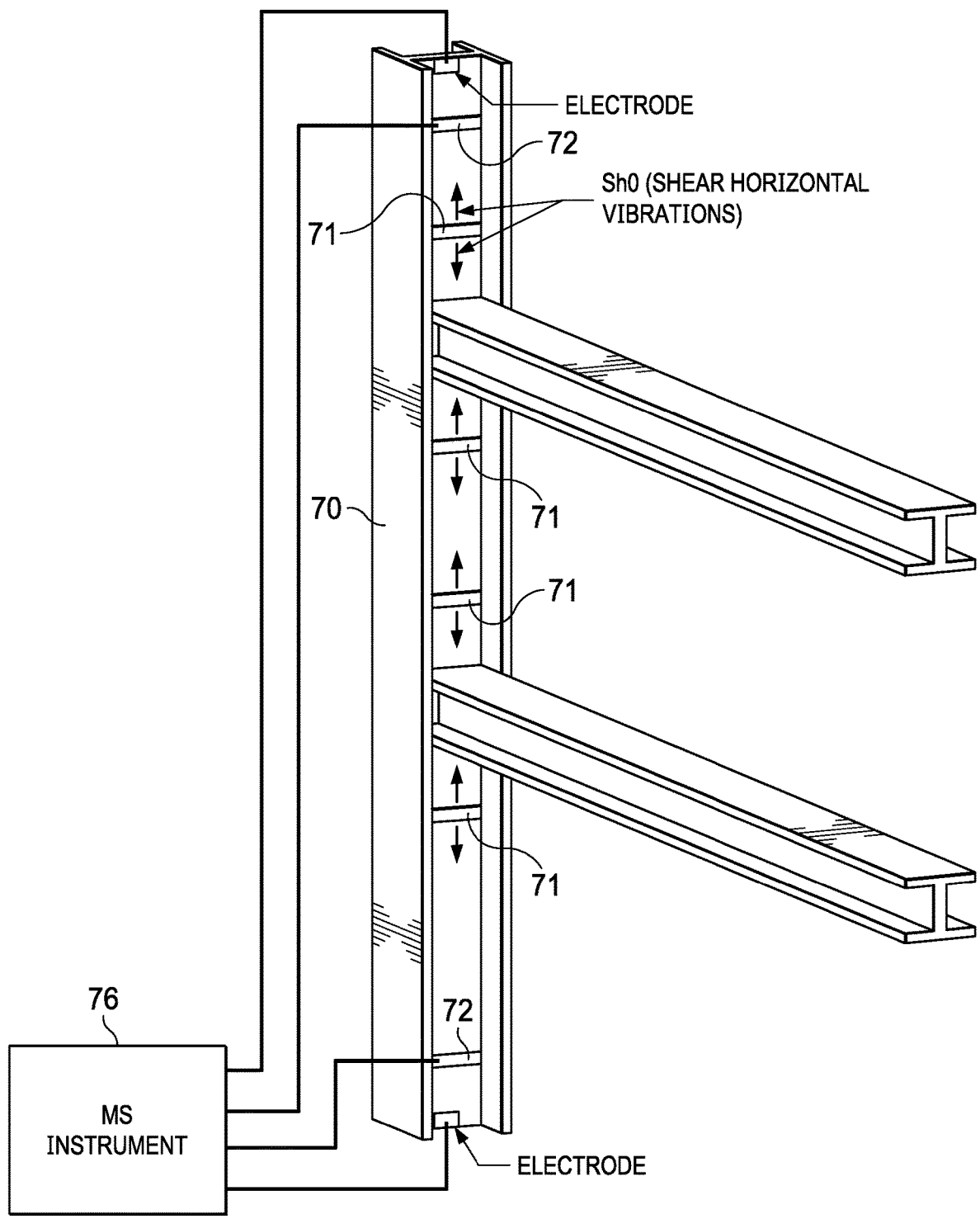

FIG. 7 illustrates an application of the method for H-beams having welded joints prone to cracking. This method uses a network of wireless MS transmitters 71. Each transmitter 71 is bonded to a structure having an H-beam 70 with welded-on cross-pieces. A passive MS receiver 72 is coupled to the H-beam at each end. For activation of the transmitters 71, two electrodes 73 are applied to the H-beam. Guided waves generated by every transmitter 71 will travel through the structure in backward and forward directions. A propagating energy can be captured by the wired receivers 72.

The MS instrumentation 76 includes a pulser-receiver MS instrument providing activation power to the transmitters 71. After the transmitters 71 are activated, multiple guided wave pulses are generated at different locations down the length of the H-beam with the center frequency of applied AC current. Each transmitter 71 covers an adjacent area and the scattered energy is delivered to a receiver 72 after traveling in the structure one-way. This is in contrast to two-way guided wave traveling when a conventional guided wave test is used in pulse-echo mode. This one-way transmission helps increase the range of coverage.

Figure 8:
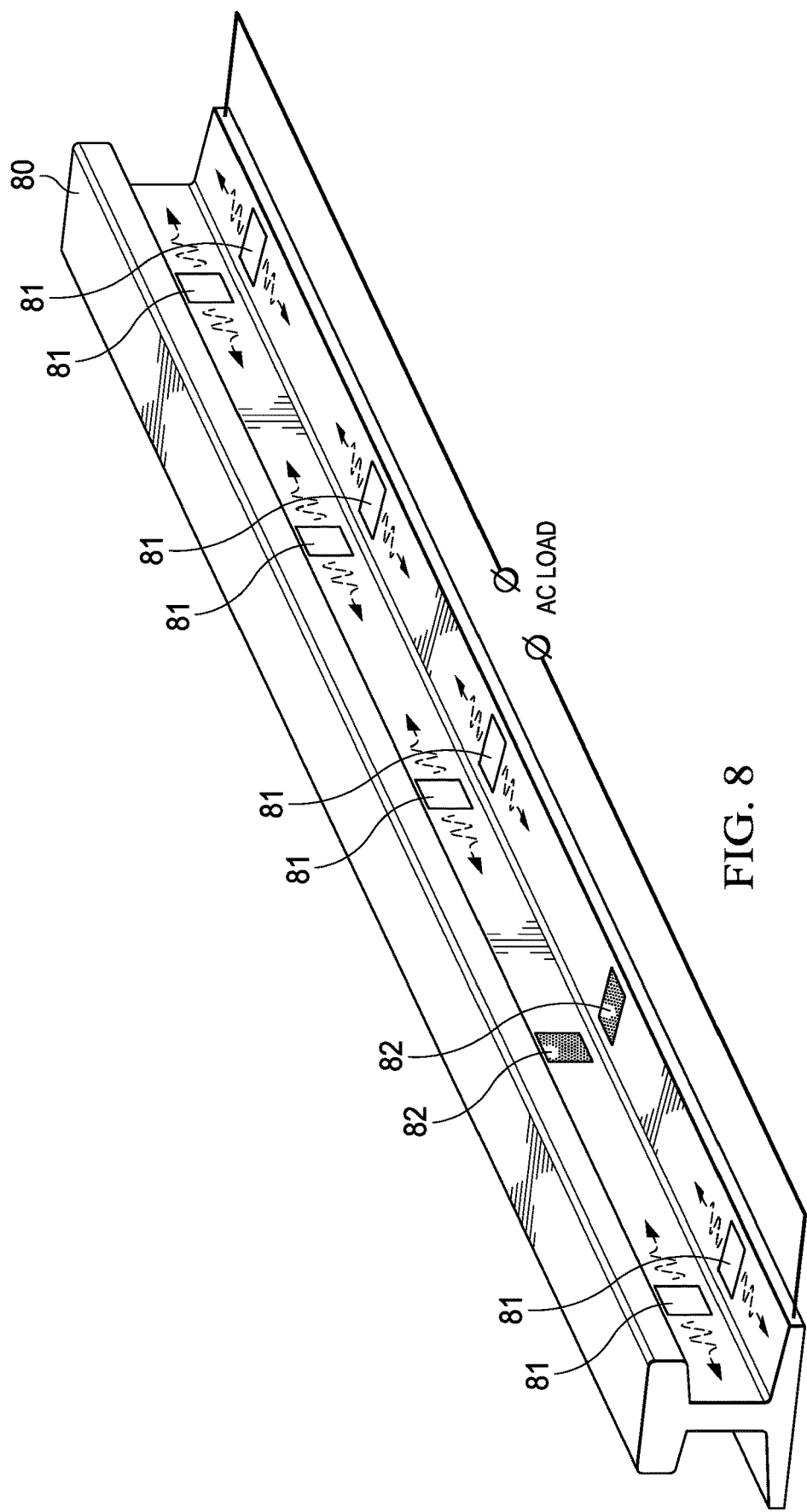

FIG. 8 illustrates an application of the wireless MS transmitter method for rails. In rails there are often areas that are known to initiate cracks due to high loads. A rail 80 has transmitters 81 installed in proximity of these areas. If the scattered wave signal travel is short, an anomaly can provide high amplitude reflection. The signal then will travel the length of the rail to a wired receiver 82.

Figure 9:
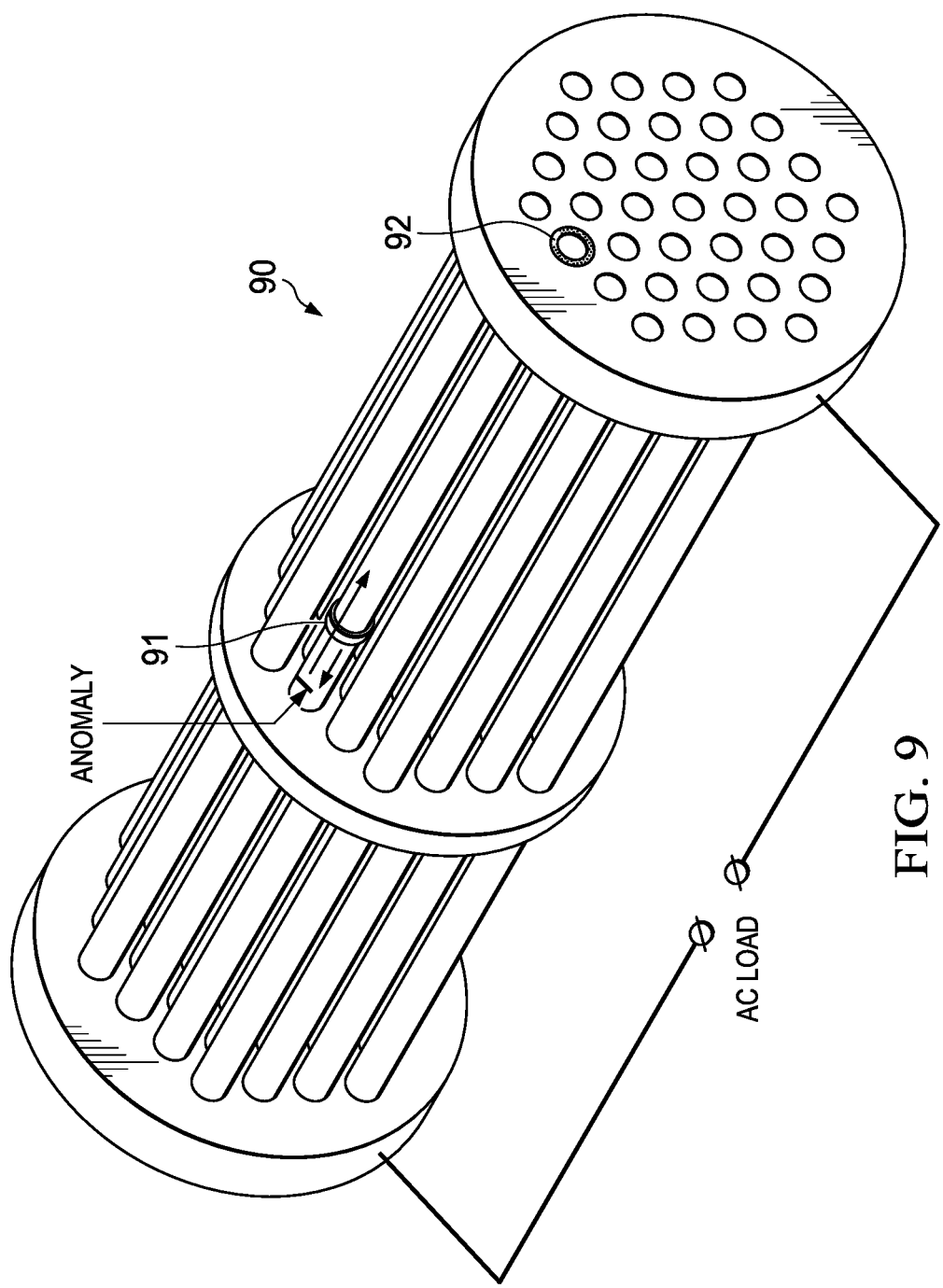

FIG. 9 illustrates an application of the wireless MS transmitter method for a heat exchanger 90. Heat exchanger 90 has a tube support plate 90a prone to cracking. A wireless transmitter 91 is installed inside the heat exchanger 90 near a tube support plate. The transmitter 91 can be activated using external electrodes and an external AC source. The signal response can be obtained using a wired receiver 92 installed in a tube sheet area or other convenient location.

What is claimed is:

1. A method of magnetostrictive (MS) guided wave testing of a ferromagnetic structure, comprising:
   providing one or more MS transmitters, each configured as a patch of ferromagnetic material;
   magnetizing the one or more MS transmitters to produce a bias magnetic field in the patch;
   acoustically coupling the one or more MS transmitters to the structure;
   acoustically coupling one or more MS receivers to the structure in a location remote from the MS transmitter;
   using an alternating current (AC) source to apply an AC current to the structure at a location remote from the one or more MS transmitters, thereby producing time-varying magnetic fields and MS vibrations in the one or more MS transmitters resulting in guided waves in the structure;
   wherein the applying step is performed without electrical coupling between the AC source and the one or more MS transmitters other than through the structure; and
   receiving MS signals at the one or more MS receivers.

2. The method of claim 1 wherein the magnetizing step is performed such that the one or more MS transmitters produce transverse guided waves.

3. The method of claim 1 wherein the magnetizing step is performed such that the one or more MS transmitters produce longitudinal guided waves.

4. The method of claim 3 wherein the magnetizing step is performed such that the one or more MS transmitters are magnetized parallel to the time-varying magnetic fields.

5. The method of claim 3 wherein the magnetizing step is performed such that the one or more MS transmitters are magnetized through their thickness.

6. The method of claim 1, wherein the magnetizing step is performed with permanent magnets, residual magnetization, or an external magnetic field.

7. A magnetostrictive (MS) guided wave test system for monitoring a ferromagnetic structure, comprising:
   one or more MS transmitters, each configured as a patch of ferromagnetic material that is acoustically coupled to the structure;
   wherein the one or more MS transmitters are magnetized to produce a bias magnetic field in the patch;
   one or more MS receivers acoustically coupled to the structure in a location remote from the MS transmitter;
   an MS instrument operable to apply alternating current (AC) to the structure at a location remote from the one or more MS transmitters, thereby producing time-varying magnetic fields and MS vibrations in the one or more MS transmitters resulting in guided waves in the structure; and further operable to receive MS signals from the one or more MS receivers;
   wherein the MS instrument has an AC source with electrical connection to the structure such that the time-varying magnetic field is produced without electrical coupling between the AC source and the one or more MS transmitters other than through the structure.

8. The system of claim 7 wherein at least one of the one or more MS transmitters is magnetized to produce transverse guided waves.

9. The system of claim 7 wherein at least one of the one or more MS transmitters is magnetized to produce longitudinal guided waves.

10. The system of claim 9 wherein the least one of the one or more MS transmitters is magnetized parallel to the time-varying magnetic fields.

11. The system of claim 9 wherein the least one of the one or more MS transmitters is magnetized through its thickness.

12. The method of claim 9 wherein the one or more MS transmitters are magnetized with permanent magnets, residual magnetization, or an external magnetic field.

13. The system of claim 7 wherein the MS instrument operates in a pulser-receiver mode for one-way guided wave testing.

14. The system of claim 7 wherein the MS instrument operates in a pulse-echo mode for two-way guided wave testing.

* * * * *